(12) United States Patent
Man et al.

(10) Patent No.: US 10,769,422 B2
(45) Date of Patent: Sep. 8, 2020

(54) NEURAL NETWORK-BASED RECOGNITION OF TRADE WORKERS PRESENT ON INDUSTRIAL SITES

(71) Applicant: indus.ai Inc, North York (CA)

(72) Inventors: Lai Him Matthew Man, North York (CA); Mohammad Soltani, North York (CA); Ahmed Aly, North York (CA); Walid Aly, North York (CA)

(73) Assignee: indus.ai Inc, North York (CA)

( * ) Notice: Subject to any disclaimer, the term of this patent is extended or adjusted under 35 U.S.C. 154(b) by 246 days.

(21) Appl. No.: 16/135,942

(22) Filed: Sep. 19, 2018

(65) Prior Publication Data

US 2020/0089942 A1    Mar. 19, 2020

(51) Int. Cl.
| | |
|---|---|
| *G06K 9/00* | (2006.01) |
| *G06N 3/08* | (2006.01) |
| *G06K 9/62* | (2006.01) |
| *G06N 20/00* | (2019.01) |

(52) U.S. Cl.
CPC ..... *G06K 9/00369* (2013.01); *G06K 9/00335* (2013.01); *G06K 9/6262* (2013.01); *G06N 3/08* (2013.01); *G06N 20/00* (2019.01)

(58) Field of Classification Search
None
See application file for complete search history.

(56) References Cited

U.S. PATENT DOCUMENTS

| | | |
|---|---|---|
| 6,440,067 B1 | 8/2002 | DeLuca et al. |
| 7,200,266 B2 | 4/2007 | Ozer et al. |
| 7,330,566 B2 | 2/2008 | Cutler |
| 7,421,369 B2 | 9/2008 | Clarkson |
| 8,179,440 B2 | 5/2012 | Ran et al. |

(Continued)

FOREIGN PATENT DOCUMENTS

| | | |
|---|---|---|
| EP | 3018626 A1 | 6/2016 |
| EP | 3171297 A1 | 5/2017 |

OTHER PUBLICATIONS

Man, U.S. Appl. No. 16/135,948, filed Sep. 19, 2018, Office Action, dated Mar. 13, 2020.

*Primary Examiner* — Hadi Akhavannik
(74) *Attorney, Agent, or Firm* — Hickman Palermo Becker Bingham LLP; Malgorzata A. Kulczycka

(57) ABSTRACT

A computer-implemented method and system for neural network-based recognition of trade workers present on industrial sites is presented. In an embodiment, a method comprises: using a computing device, receiving a plurality of digital images depicting a particular worker; using the computing device, based on the plurality of digital images, determining a plurality of key-point sets of the digital images, each of the plurality of key-point sets comprising location information of key points identified within a depiction of the particular worker in a particular digital image; using the computing device, based on the plurality of key-point sets, determining a plurality of trade-specific activities that appear to be performed by the particular worker; using the computing device, based on the plurality of trade-specific activities, determining a plurality of trade probabilities, each trade probability among the trade probabilities indicating a likelihood that the particular worker belongs to a particular trade from among a plurality of different trades.

20 Claims, 6 Drawing Sheets

(56) References Cited

U.S. PATENT DOCUMENTS

| | | |
|---|---|---|
| 9,278,255 B2 | 3/2016 | Cheng et al. |
| 9,501,837 B2 | 11/2016 | Frosio, et al. |
| 2007/0122000 A1 | 5/2007 | Venetianer |
| 2010/0040285 A1 | 2/2010 | Csurka |
| 2011/0012903 A1* | 1/2011 | Girard ................. G06T 13/40 345/474 |
| 2011/0069888 A1* | 3/2011 | Lim ................ G06K 9/00369 382/190 |
| 2013/0073387 A1* | 3/2013 | Heath ................ G06Q 30/02 705/14.53 |
| 2015/0235474 A1* | 8/2015 | Mullins ............... G06T 19/006 345/419 |
| 2016/0086350 A1* | 3/2016 | Michel ................ G06T 7/251 382/103 |
| 2017/0200067 A1 | 7/2017 | Zhou et al. |
| 2017/0206662 A1 | 7/2017 | Wang et al. |
| 2017/0213112 A1 | 7/2017 | Sachs et al. |
| 2017/0220887 A1 | 8/2017 | Fathi et al. |
| 2017/0344832 A1* | 11/2017 | Leung ............... G06K 9/00342 |
| 2017/0345181 A1* | 11/2017 | Yu ........................ H04N 7/181 |
| 2017/0351417 A1* | 12/2017 | Manico ................ G06F 16/50 |
| 2017/0351910 A1* | 12/2017 | Elwazer ............. G06K 9/6269 |
| 2017/0372216 A1* | 12/2017 | Awiszus ................ A62B 27/00 |
| 2018/0033276 A1* | 2/2018 | Whelan ................. G08B 21/02 |
| 2019/0220657 A1* | 7/2019 | Yabuki ............. A63B 24/0062 |
| 2020/0090316 A1 | 3/2020 | Man |
| 2020/0121987 A1* | 4/2020 | Loh ................... A63B 24/0062 |
| 2020/0160046 A1* | 5/2020 | Andreou ........... G06K 9/00563 |
| 2020/0210692 A1* | 7/2020 | Asayama .............. G06T 7/521 |

\* cited by examiner

NEURAL NETWORK-BASED RECOGNITION OF TRADE WORKERS PRESENT ON INDUSTRIAL SITES

TECHNICAL FIELD

One technical field of the present disclosure is programmed computers capable of performing machine vision. Another technical field is computer-implemented surveillance of physical locations. The disclosure generally relates to improved methods, computer software or computer hardware in the field of managing industrial sites using neural networks. The disclosure relates more specifically to improved computer-implemented methods for using surveillance mechanisms to monitor and track persons, physical assets, deliveries, and materials in the industrial sites.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Managing large industrial sites often includes tracking the persons present on the sites. Tracking of the persons may be helpful in determining efficiency and accountability of the workers and contractors. The tracking may include determining the workers and contractors that are present on or near the industrial site and determining the times during which the workers and contractors are present on the industrial site. The tracking may also include determining the type of work that the workers and contractors perform on the sites during certain times.

However, it is usually difficult to track workers and contractors present on industrial sites. Traditionally, the industrial sites are monitored by managers and supervisors. But, it is often impossible for the managers and supervisor to observe everything at all times. Monitoring the workers is especially difficult in large industrial sites in which many activities occur at the same time, and which experience heavy traffic, loud noises and distractions.

To assist managers and supervisor in monitoring industrial sites, some sites use digital cameras that are configured to collect videos and images from the sites. However, since the cameras collect vast amounts of videos and photographs, reviewing the vast amounts of data may be tedious and time consuming.

Some industrial sites rely on computerized systems. The systems may include computer servers that communicate with many different devices via communications networks. However, since the devices are usually heterogeneous, they may be difficult to manage. For example, it may be difficult to synchronize their different frame rates, different time delays, and different resolutions. Furthermore, processing the collected data may require specialized personnel that in turn, may require an extensive and continuous training. Moreover, due to the complexity and non-standardized nature of the collected data, the computerized systems deployed at industrial sites are often unable to provide results in a timely fashion.

SUMMARY

The appended claims may serve as a summary of the invention.

DESCRIPTION OF EXAMPLE EMBODIMENTS

Figure 1:
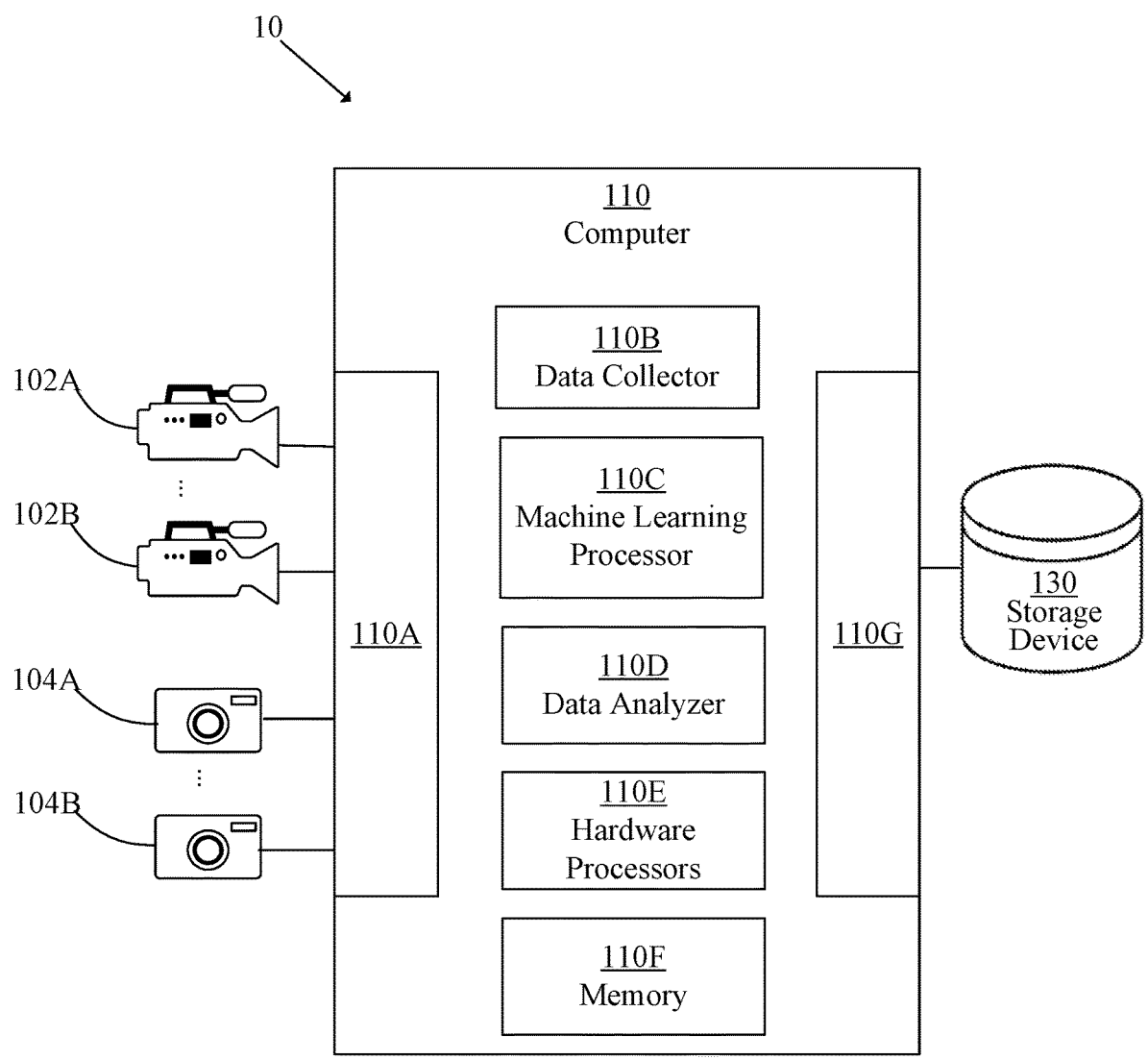
FIG. 1 illustrates an example computer system in which the techniques described may be practiced, according to some embodiments.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. OVERVIEW
2. EXAMPLE SYSTEM ARCHITECTURE
3. EXAMPLE WORKFLOW
4. IMAGE PROCESSING
5. EXAMPLE SYSTEM CONFIGURATION
6. EXAMPLE SENSOR MESHES
7. EXAMPLE IMPROVEMENTS PROVIDED BY CERTAIN EMBODIMENTS
8. IMPLEMENTATION EXAMPLE—HARDWARE OVERVIEW
9. EXTENSIONS AND ALTERNATIVES

1. OVERVIEW

In an embodiment, an approach for recognizing, using neural networks, trade workers present on industrial sites is presented. The approach employs neural networks and machine vision technology to recognize, from digital images, certain attributes and characteristics of workers that appear to be present on the industrial sites and uses the attributes and characteristics to determine trade workers that are likely to be present on the sites.

The approach can be used for surveillance and management purposes. For example, the approach may provide surveillance mechanisms for monitoring and tracking persons, physical assets, deliveries and materials in an industrial site. The approach may also provide information, such as counts of workers that were present on the industrial site during a particular time period, that can be used to determine worker productivity and accountability.

In an embodiment, a computer-implemented method comprises receiving, by a computer device, a plurality of digital images depicting a particular worker who is present on an industrial site. The plurality of digital images that depict the particular worker may be obtained by processing input video streams provided by video cameras mounted throughout the industrial site. The video cameras may include indoor cameras and/or outdoor cameras. The video streams and or the plurality of digital images may be provided to the computer device in any possible communications manner, including wire-based communications, Wi-Fi based communications, communications via a power cable, and via any other media configured to carry and/or transmit data.

Processing of the input video streams to determine the images that depict the particular worker may start with receiving a video stream from a video camera mounted inside or outside of an industrial site. The video stream is referred to herein as a plurality of unprocessed images. From the plurality of unprocessed images, the plurality of images that depict the particular worker is selected.

Selecting, from the plurality of unprocessed images, the plurality of images that depict the particular worker may be performed using different approaches. One approach may include detecting a plurality of objects in the plurality of unprocessed images and using neural computer networks to determine which objects depict the particular worker. Detecting the plurality of objects in the plurality of unprocessed images may include detecting colors of hard hats that are depicted in the plurality of unprocessed images, detecting stickers attached to hard hats depicted in the plurality of unprocessed images, or detecting monochrome patterns of numbers, characters, symbols or polygons. A sticker may be, for example, an Aruco sticker, or a sticker similar to a color-coded Aruco sticker. Furthermore, multiple colors may be used as a signature of a particular trade. (e.g., a sticker may have both a red strip and a blue strip).

Color-coded stickers, or markers, attached to hard hats, or vests, may be used to identify workers present on an industrial site. The stickers may be either individual stickers or stickers combined with so called certified safety stickers. A certified safety sticker is a sticker that depicts a number, or code, assigned to the worker once the worker is successfully completed a worker orientation and has been certified to work on the job site. Both a color-coded sticker and a certified safety sticker may be combined into one sticker and used for two purposes: to identify a worker present on the industrial site and to indicate that the worker has been certified.

In an embodiment, color-coded stickers attached to hard hats, or vests, are used to count the number of workers per trade. Examples of trades include plumbers, electricians, carpenters, steelworkers, sheet metal workers and so forth.

Hard hats that workers wear may also be color-coded, and different colors may be assigned to different worker trades. For example, plumbers may wear red hard hats, while electricians may wear blue hard hats.

Color-coded stickers and color-coded hard hats, or vests, may be used to count the workers and worker trades present on an industrial site. Color stickers may be attached to, for example, the front or the back of a safety vest. The counting may be performed in many different ways. For example, if different hard hat colors are assigned to different trades, then a count of worker trades may be computed based on the detected hat colors.

According to another example, if different sticker colors are assigned to different worker trades, then a count of worker trades may be computed based on the detected sticker colors.

According to another example, the counts may be computed as a combination of the hat colors and the sticker colors. For instance, if the plumbers wear red hard hats with white stickers, then a count of the plumbers present on the industrial site may be computed based on the detected red hard hats with white stickers.

According to another example, the counts may be computed as a combination of vest colors and the sticker colors. For instance, if the carpenters wear red vests with white stickers, then a count of the carpenters present on the industrial site may be computed based on the detected red vests with white stickers.

Detecting the plurality of objects in the plurality of unprocessed images may also include recognizing, based on depiction of meshes of electronic sensor attached to persons depicted in the images, positions of workers depicted in the plurality of unprocessed images, or detecting colors of outfits that are worn by workers depicted in the plurality of unprocessed images.

Once the objects depicting workers are identified in the unprocessed images, those unprocessed images that include the objects depicting the particular worker are grouped together and collectively referred to as the plurality of images that depict the particular worker.

In an embodiment, selecting, from the plurality of unprocessed images, the plurality of images that depict the particular worker may be performed by executing a convolutional neural network ("CNN") on the plurality of unprocessed images.

In machine learning, a CNN is a deep, feed-forward artificial neural network that is most commonly applied to analyzing digital images. A typical CNN uses a variation of multilayer perceptrons that usually require a minimal amount of processing. A typical CNN uses relatively little processing compared to processing performed by other image classification algorithms because the CNN learns the filters for the images, while the traditional algorithms require hand-processing of the images.

A CNN may be configured with two components: a hidden layer/feature extraction component and a classification component. The hidden layer/feature extraction component is used to perform a series of convolutions and pooling operations during which the features depicted in a digital image are detected. The classification component serves as a classifier on a top of the extracted features. The classifier may be used to assign a probability indicating a likelihood that the object depicted in the image is indeed what the algorithm predicts the object is.

Output from the CNN may include the plurality of images depicting the particular worker and may be ported to another CNN. This CNN may execute a CNN-based detector. The CNN-based detector may output key-point sets determined for meshes of sensors captured in the images. The key-point sets may capture location information of the sensors shown in the plurality of images depicting the particular worker.

In an embodiment, a key-point set, of the plurality of key-point sets, determined for an image, of the plurality of images, comprises location information of key points identified within a depiction of the particular worker in the image. Locations of the key points may correspond to locations of the sensors that are depicted in an image and are attached to a person depicted in the image. The key points may correspond to a mesh of sensors attached to the particular person and may be compared with known templates of different poses that the workers may assume while working on the job. For example, a worker that is kneeling may be a worker that lays the floors. Examples of different key points and meshes are described in FIG. 5A, FIG. 5B, FIG. 5C, FIG. 5D.

A sequence of key-points may be provided to a recurrent neural network ("RNN").

An RNN is an artificial neural network in which connections between nodes form a directed graph long sequence, and thus capture temporal dynamic behavior for a time sequence. A typical RNN may use its internal state to process sequences of inputs, and therefore, the RNN may be configured to recognize objects in digital images. Based on the sequence of key-points provided to the RNN, the RNN may predict a trade-specific activity that the particular person, depicted in the images, is performing. Examples of the trade-specific activities may include walking, standing, kneeling, climbing stairs, and the like.

In an embodiment, a length of the sequence used by the RNN is 30 frames. This means that if a video stream is recorded at a speed of five frames per second ("FPS"), then the six-second-long video stream needs to be provided to the RNN. The output generated by the RNN may include a plurality of trade-specific activities, each of which may be performed by the particular worker depicted in the images.

Based on the plurality of trade-specific activities, the RNN may determine a plurality of trade probabilities indicating the probabilities that the particular worker is indeed performing the corresponding trade-specific activities. A trade probability, of a plurality of trade probabilities, indicates a likelihood that the particular worker belongs to a trade of a plurality of trades. Examples of trades includes steelers, concrete pourers, concrete swipers, carpenters, floor workers, drywall workers, painters, electricians, glassers, plumbers, mechanical workers, wall builders, and the like.

Figure 5A:
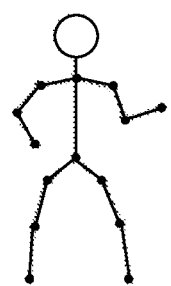
FIG. 5A, FIG. 5B, FIG. 5C, FIG. 5D depict examples of sensor meshes used to recognize trade workers present on industrial sites.

For example, if an image stream depicts a key-point set that corresponds to a sensor mesh such as the one depicted in FIG. 5A, then the RNN may determine that a depicted person is probably carrying a long plank or a beam, and perhaps the depicted person is a wall builder. According to another example, if an image stream depicts a key-point set that corresponds to a sensor mesh such as the one depicted in FIG. 5D, then the RNN may determine that a depicted person is probably kneeling, and thus the depicted person may be laying the floors. Hence, the depicted person may be a carpenter.

In an embodiment, the plurality of trade probabilities of the trades determined for the particular worker depicted in the plurality of images needs to be confirmed or verified using another source of information. The accuracy of the determined trade probabilities may be verified, for example, using context information derived from the images. This may include identifying a plurality of backgrounds depicted in the images and determining a plurality of context probabilities that the identified backgrounds are indeed depicted in the images. This process may be referred to as a patch-based scene segmentation and may be performed by a CNN. The details of the patch-based scene segmentation approach are outside the scope of this disclosure and are provided in another patent application.

In an embodiment, a process of determining a plurality of context probabilities starts with extracting a plurality of background datasets from the plurality of images. The plurality of images used in this process is the same images that was used to determine the plurality of trade probabilities. Alternatively, the plurality of images used in this process is a plurality of unprocessed images. This time, however, the plurality of images is used to determine backgrounds depicted in the images and to determine context information for the backgrounds.

Based on the plurality of background datasets, a plurality of context probabilities is determined. A context probability, of the plurality of context probabilities, indicates a likelihood that a background dataset, of the plurality of background datasets, indicates a trade-specific context of a plurality of trade-specific contexts.

The context information and the corresponding context probability for an image may be determined using one or more neural networks. For example, a boundary of the scene depicted in the image, which confines the depicted worker, may be determined using the patch-based scene segmentation process executed by a CNN.

In an embodiment, an image of a particular scene is provided to a multi-class CNN-based classifier that outputs a probability that the scene belongs to a particular label, i.e., that the scene depicts a particular background indicative of a particular trade. Examples of different background include concrete walls, wood walls, wood floors, steel wires, glass windows, doors, electrical wires, and the like. The context probabilities are collectively referred to as a plurality of context probabilities.

Based on both the plurality of trade probabilities and the plurality of context probabilities, a plurality of refined probabilities is determined. A refined probability, of the plurality of refined probabilities, determined for a particular trade indicates a modified likelihood that the particular worker, depicted in the plurality of images, belongs to the particular trade of the plurality of trades. The probability refining process allows augmenting or correcting the previously determined plurality of trade probabilities by using the plurality of context probabilities to, for a particular trade probability, either strengthen the trade probability or weaken the trade probability for the particular worker.

Then, a highest probability is selected from the plurality of refined probabilities. This allows determining the trade to which the particular worker, depicted in the plurality of images, most likely belongs. Based on the highest probability, a particular trade, from the plurality of trades, to which the particular worker belongs is determined.

The above process may be repeated until a plurality of trades for all workers depicted in all provided video streams is determined. Based on the plurality of trades, counts of workers for each trade of the plurality of trades is determined.

In an embodiment, the counts of workers for each trade may be provided to a management team that oversees the industrial site. The management team may use the provided counts and other information to determine and verify whether the scheduled work has been timely performed. The information may be also used to determine the workers' productivity and accountability. The information may be also used to identify issues and problems that may require an immediate intervention or action.

2. EXAMPLE SYSTEM ARCHITECTURE

FIG. 1 illustrates an example computer system 10 in which the techniques described may be practiced, according to some embodiments.

In one embodiment, a computer system comprises components that are implemented at least partially in hardware, such as one or more hardware processors executing program instructions stored in one or more memories as described herein. In other words, all functions described herein are intended to indicate operations that are performed using programming in a special-purpose computer or a general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 depicts a plurality of data input devices including 102A, 102B, 104A, 104B, one or more computers 110, one or more data storage devices 130. The devices may communicate with each other via wireless networks, local communications network, and/or wide area communications networks. Data input devices may include one or more video cameras 102A, 102B, and one or more digital cameras 104A, 104B. Although not depicted in FIG. 1, the data input devices may also include other devices.

Data input devices may be configured to collect information about persons, objects and activities taking place in an industrial site. For example, video cameras 102A, 102B, may be configured or programmed to record video segments depicting persons, trucks, and cranes present in an industrial site, store the recorded video segments, and transmit the recorded video segments to computer 110. Digital cameras 104A, 104B may be configured or programmed to capture digital images. The images may depict, for example, persons, trucks, and cranes present on an industrial site. The images may be transmitted to computer 110.

Computer 110 may be any type of computing device, including a mobile device such as a smartphone, a laptop, a PC, a tablet, a computer server, and the like. Computer 110 may be a computer-based system configured to receive data collected by cameras, and process and analyze the received data.

Computer 110 may be configured to execute a plurality of processes designed to monitor activities, machines, and persons. Computer 110 may also be configured to generate output that may include counts of workers of different trades, activity records, activity metrics, and activity-based alerts for an industrial site. The output generated by computer 110 may be used directly or indirectly to manage the industrial site.

Computer 110 may also generate warnings, alerts or reports. The warnings, alerts or reports may be used to deter safety and security violations, corruption, and inefficiencies in using machines, materials, or equipment. The messages, warnings, and alarms may indicate safety violations, corruption, or inefficiencies.

In an embodiment, computer 110 is part of a public or a private cloud system. Access to computer 110 may be secured using credentials. The credentials may be provided to a management team or a system administrator.

Alternatively, computer 110 may be a privately-owned computing device that is operated on behalf of a management team. It may be implemented within a local network managed by an industrial site or may be an independent device configured outside the local network of the industrial site.

In an embodiment, computer 110 includes an input interface 110A that is configured to receive data from data input devices, such as video cameras 102A, 102B, and/or digital cameras 104A, 104B.

Computer 110 may also include an output interface 110G for outputting data. Computer 110 may use output interface 110G to, for example, transmit counts of workers detected as being present on an industrial site, and/or transmit warnings and alarms to data storage device 130. The information stored in storage 130 may be distributed to a management team.

Computer 110 may include a data collector 110B that is configured to receive data from input interface 110A. Data collector 110B may be also configured to translate the received data to a particular data format. For example, data collector 110B may be used to convert data from one format to another. If the data received from video camera 102A is in a format that is different than the format in which computer 110 records the data, then data collector 110B may convert the data received from video camera 102A to the format that video camera 102B is using.

Computer 110 may further include a machine learning processor 110C configured to execute a machine learning program, algorithm, or process. Machine learning processor 110C may be executed as a combination of CNNs and RNNs, described above.

Machine learning processor 110C may process data provided by any of the data input devices 102A-B, 104A-B to analyze, enhance and improve the content of the received data. For example, machine learning processor 110C may be configured to process the data provided by the video cameras, and digital cameras, and determine counts of trade workers present on an industrial site.

Computer 110 may also include a data analyzer 110D. Data analyzer 110D may be configured to execute a computer modeling approach, statistical analysis, computer modeling, and other types of processing to generate additional output data.

Computer 110 may also include one or more hardware processors 110E configured to execute instructions stored in memory 110F, and to cause instantiating of data collector 110B, machine learning processor 110C, and data analyzer 110D.

Computer 110 may be communicatively connected to storage device 130. The communications between computer 110 and storage device 130 may be facilitated by one or more computer networks including, but not limited to, a Wi-Fi network, a Local Area Network (LAN), a Wide Area Network (WAN), the Internet, and a company private network. The communications may also by facilitated by physical power cables.

Storage device 130 may be configured to store program applications and instructions used by data collector 110B, machine learning processor 110C, and data analyzer 110D to process received data. Storage device 130 may be used to store data format translators, neural network models, neural network parameters, specifications of the data input devices, default data models, statistical programs and functions to perform a statistical analysis, and the like.

Storage device 130 may be configured to store data used and generated by computer 110. Storage device 130 may be implemented in one or more hard disk drives, or other electronic digital data devices configured to store data. Storage device 130 may include an individual device (as depicted in FIG. 1), or a plurality of storage devices placed in various locations (not depicted in FIG. 1). For example, storage device 130 may be implemented in a plurality of nodes of distributed data networks.

Storage device 130 may be implemented as a device separate from computer 110, as depicted in FIG. 1. Alternatively, storage device 130 may be implemented as part of computer 110 or may be implemented within the same computer network as computer 110.

Storage device 130 may include one or more databases such as relational databases, hybrid databases, columnar databases, and the like.

3. EXAMPLE WORKFLOW

In an embodiment, an approach for recognizing, using neural networks, trade workers present on industrial sites is implemented in any type of computer devices, including mobile devices, PCs, laptops, computer servers, and others. The computer device may communicate with image collection devices, such as video cameras and cameras, via any type of communications networks, including Wi-Fi networks, LAN networks, WAN networks, dedicated networks, or power cables.

Figure 2:
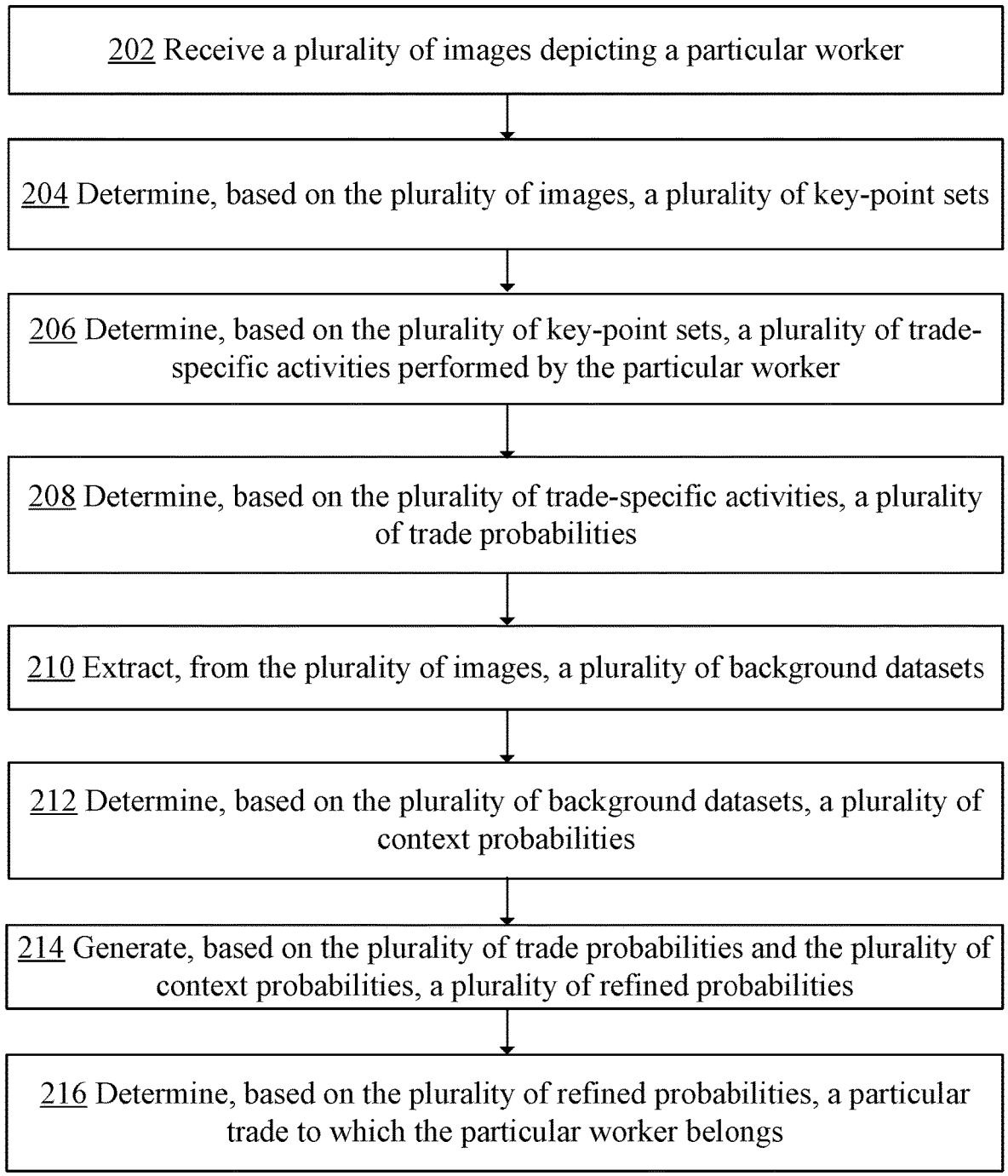
FIG. 2 depicts an example workflow for recognizing trade workers in industrial sites using neural network-based approach.

FIG. 2 depicts an example workflow for recognizing trade workers in industrial sites using neural network-based approach. The example workflow may be executed collectively by data collector 110B, machine learning processor 110C and data analyzer 110D, all depicted in FIG. 1. Some, or all, of the processing, may be performed by one or more CNN and/or one or more RNN.

To provide a clear description, a processor that collectively executes the workflow that is depicted in FIG. 2 and that is performed by data collector 110B, machine learning processor 110C and data analyzer 110D is referred to herein as a computer processor.

In step 202, a computer processor receives a plurality of images depicting a particular worker. The plurality of images that depict the particular worker may be obtained by processing input video streams provided by video cameras mounted throughout the industrial site. The processing of the input video streams is described in FIG. 3.

In step 204, the computer processor determines, based on the plurality of images depicting the particular person, a plurality of key-point sets. A key-point set, of the plurality of key-point sets, determined for an image, of the plurality of images, comprises location information of key points identified within a depiction of the particular worker in the image. Locations of the key points may correspond to locations of the sensors that are depicted in an image and are attached to a person depicted in the image. The key points may correspond to a mesh of sensors attached to the particular person and may be compared with known templates of different poses that the workers may assume while working on the job. Examples of sensor meshes are described in FIG. 5A-5D.

In step 206, the computer processor determines, based on the plurality of key-point sets, a plurality of trade-specific activities performed by the particular worker. This may include determining, based on the key-point sets, arrangements of the key points, and matching the arrangements to known positions that trade workers may assume while working on the job. Once one or more matches are found, labels for the matching known positions are identified. The labels correspond to trade-specific activities that trade workers may perform while on the job. Examples of the trade-specific activities may include walking, standing, kneeling, climbing stairs, and the like.

In step 208, the computer processor determines, based on the plurality of trade-specific activities, a plurality of trade probabilities. A trade probability, of the plurality of trade probabilities, indicates a likelihood that the particular worker belongs to a trade of a plurality of trades.

For example, if the computer processor determined, based on the plurality of key-point sets, that the person depicted in the images is probably kneeling, and if the kneeling activity has an associated label of kneeling, and the kneeling is associated with a trade called carpenters, then the computer processor determines a probability that the depicted person is indeed a carpenter. The probability depends on a likelihood that the key-point sets show that the depicted person is indeed kneeling. The higher the likelihood that the key-point sets show that the depicted person is indeed kneeling, the higher the corresponding probability that the person is a carpenter.

In some cases, the plurality of trade probabilities of the trades determined for the particular worker depicted in the plurality of images may not sufficiently indicate the trade to which the particular worker belongs. In some cases, the plurality of trade probabilities needs to be confirmed or verified using another source of information. The accuracy of the determined trade probabilities may be verified, for example, using information about backgrounds that are depicted in the images. The background information may be derived from the images. The process begins in step 210. The process may be performed using a patch-based scene segmentation approach implemented in a CNN.

In step 210, the computer processor extracts a plurality of background datasets from the plurality of images. Examples of different background datasets include data that captures information about materials such as concrete walls, wood walls, steel wires, glass windows, doors, electrical wires, and the like.

In step 212, the computer processor determines, based on the plurality of background datasets, a plurality of context probabilities.

A particular context probability, from among the plurality of context probabilities, indicates a likelihood that a background dataset, of the plurality of background datasets, indicates a trade-specific context of a plurality of trade-specific contexts. For example, if a background dataset captures information about materials such as wood floors, then based on the background dataset, the computer processor may determine that a probability that the images depict a carpenter that is laying wood floors in a building.

In step 214, the computer processor generates, based on the plurality of trade probabilities and the plurality of context probabilities, a plurality of refined probabilities.

A refined probability, of the plurality of refined probabilities, indicates a modified likelihood that the particular worker belongs to a trade of the plurality of trades. For example, if the plurality of trade probabilities indicated that the particular worker depicted in the images is either a carpenter or an electrician, and the plurality of context probabilities indicated that the particular worker depicted in the images is either a carpenter or a plumber, then by processing both the plurality of trade probabilities and the plurality of context probabilities, the computer processor may determine the highest probability indicating that the particular worker is a carpenter, a lower probability indicating that the particular worker is an electrician, and the lowest probability that the particular worker is a plumber.

In step 216, the computer processor selects, from the plurality of refined probabilities, a highest probability. Continuing with the above example, the computer processor may select the highest probability that the particular worker depicted in the images is a carpenter.

Based on the highest probability, the computer processor determines a particular trade to which the particular worker belongs. Continuing with the above example, the computer processor may determine that "carpenter" is the trade to which the particular worker depicted in the images belongs.

In an embodiment, trade recognition may be based on finding a position of a worker, finding a position of the worker's hands, and detecting the materials that the worker is touching or the materials that are near the worker.

In an embodiment, trade recognition is performed by analyzing surroundings depicted in the image showing a worker. The surroundings may include materials such wood present either outdoors or indoors. For example, if a worker is working with wood in an outdoor setting, then it may be deduced that the worker is a form-worker. However, if a worker is working with wood in an interior setting or on the certain phase of the project, then the worker may be a carpenter working on cabinetry. According to another example, if a worker is working on steel bars of a floor, then the worker may be a re-bar or ironworker. If a worker is depicted as being inside a building and working on sheet metals, then the worker may be a sheet metal worker working on HVAC systems.

In an embodiment, trade recognition is performed by analyzing positions and orientation of hands of a worker depicted in an image or a stream of images. This may include analyzing the sensor configuration in the sensor set obtained from the image or the stream of images. For example, if a worker is depicted in an image as touching a glass panel near an edge of the building, then the worker may be a window installer. According to another example, if a worker is depicted as touching tiles in the interior of the building, then the worker may be a tiler.

It is possible that two or more refined probabilities are the highest probabilities. In such a case, the computer processor may repeat some of the processing to refine the probabilities. Alternatively, the computer processor may give preferential treatment to the trade probabilities over the context probabilities and determine the resulting trade for the particular worker based on the highest trade probability.

4. IMAGE PROCESSING

Figure 3:
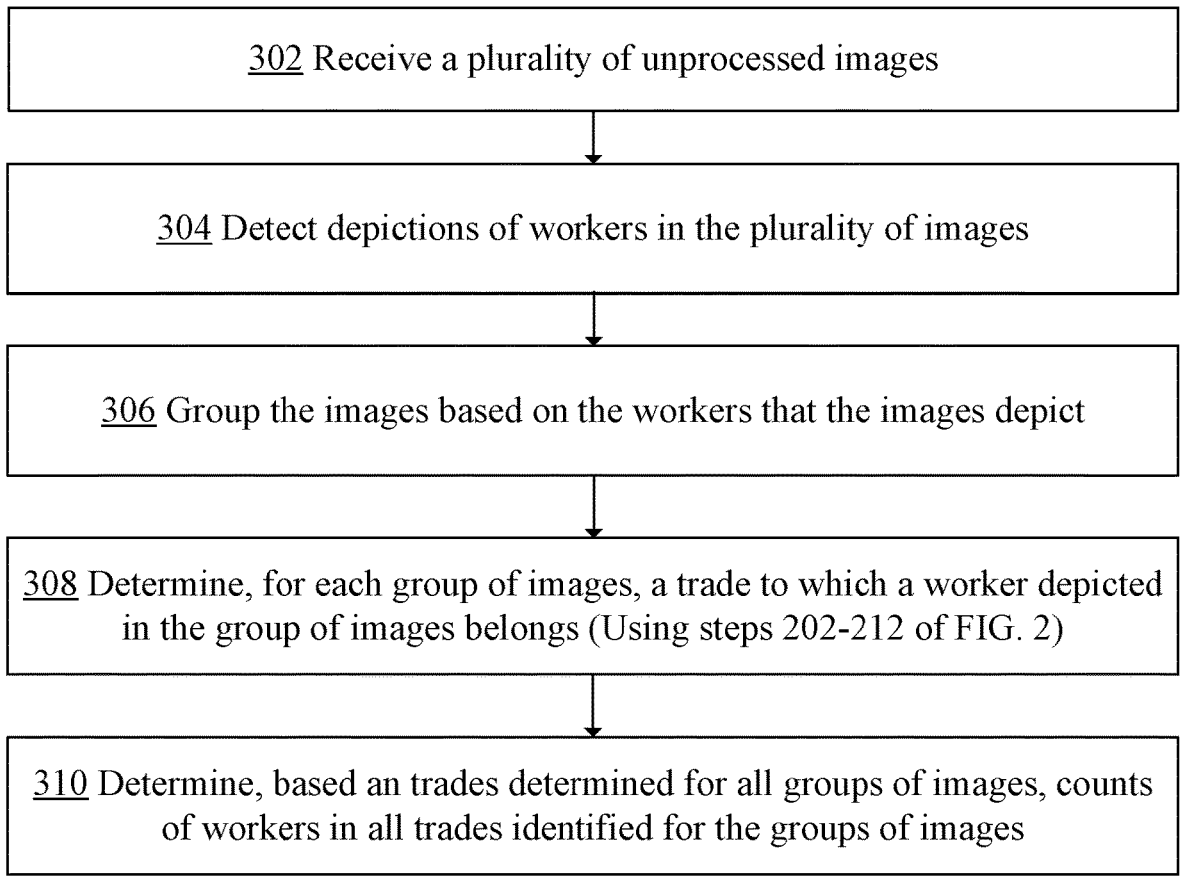
FIG. 3 depicts an example computer processing flow or workflow for processing images depicting trade workers in industrial sites.

FIG. 3 depicts an example computer processing flow or workflow for processing images depicting trade workers in industrial sites. The example workflow may be executed collectively by data collector 110B, machine learning processor 110C and data analyzer 110D, all depicted in FIG. 1. Some, or all, of the processing, may be performed by one or more CNN and/or one or more RNN. To provide a clear description, a processor that collectively executes the workflow that is depicted in FIG. 3 and that is performed by data collector 110B, machine learning processor 110C and data analyzer 110D is referred to herein as a computer processor.

In step 302, the computer processor receives a plurality of unprocessed images. The received plurality of unprocessed images may include unprocessed video streams provided by video cameras installed inside or outside of an industrial site.

In step 304, the computer processor selects, from the plurality of unprocessed images, the plurality of images that depict the particular worker. The selecting, from the plurality of unprocessed images, the plurality of images that depict the particular worker may be performed by executing a CNN.

Selecting, from the plurality of unprocessed images, the plurality of images that depict the particular worker may include detecting a plurality of objects in the plurality of unprocessed images. The selecting may also contain including, in the plurality of images that depict the particular worker, those images in which detected objects include the particular worker.

In an embodiment, the selecting may include detecting a plurality of objects in the plurality of unprocessed images and using neural computer networks to determine which objects depict the particular worker. Detecting the plurality of objects in the plurality of unprocessed images may include detecting colors of hard hats that are depicted in the plurality of unprocessed images, detecting stickers attached to hard hats depicted in the plurality of unprocessed images, recognizing, based on depiction of meshes of electronic sensor attached to persons depicted in the images, positions of workers depicted in the plurality of unprocessed images, or detecting colors of outfits that are worn by workers depicted in the plurality of unprocessed images.

Once the objects depicting workers are identified in the unprocessed images, the computer processor, in step 306, groups those unprocessed images that include the objects depicting the particular worker into one group, which is collectively referred to as the plurality of images that depict the particular worker.

At this point, the processing of the unprocessed images is completed. The obtained plurality of images that depict the particular worker is provided to the process that is described in FIG. 2.

Steps 302, 304, 306 may be performed until the computer processor determines one or more groups of images, each group of the images depicting a different worker of a plurality of workers.

Once one or more groups of images, wherein each group depicting a different worker, are determined, the computer processor determines, in step 308, a plurality of trades for all workers identified in the groups. This may be performed by, for example, determining, for each group of images, a trade to which a worker depicted in the group of images belongs.

In an embodiment, determining the plurality of trades for all workers of the plurality of workers may be performed using the process described in FIG. 2.

In step 310, the computer processor determines, based on the plurality of trades determined for the workers depicted in the groups of images, counts of workers for each trade of the plurality of trades.

The counts may be provided to a management computer to, for example, determine improvements in managing industrial sites. For example, the management computer may use the provided counts to assess the workers' accountability and productivity. For example, based on the provided counts, the management computer may determine the workers' productivity, absenteeism, redundancies, and inefficiencies. Furthermore, based on the provided counts, the management computer may determine whether the invoices submitted by the contractors are correct and whether the work for which the invoices have been provided is indeed completed by the contractors.

The provided counts may be also used to determine performance statistics. For example, based on the counts, the management computer may determine a production rate and status for the work performed on the industrial site. For example, based on the counts, the management computer may determine how many square feet of cement has been poured per hour on a construction site. Based on the counts, the management computer may also determine how many workers worked on the site to pour the cement. Furthermore, based on the counts, the management computer may determine how many windows were installed per day, how much time did it take to install the windows, and how many workers worked on the site to install the windows.

5. EXAMPLE SYSTEM CONFIGURATION

Figure 4:
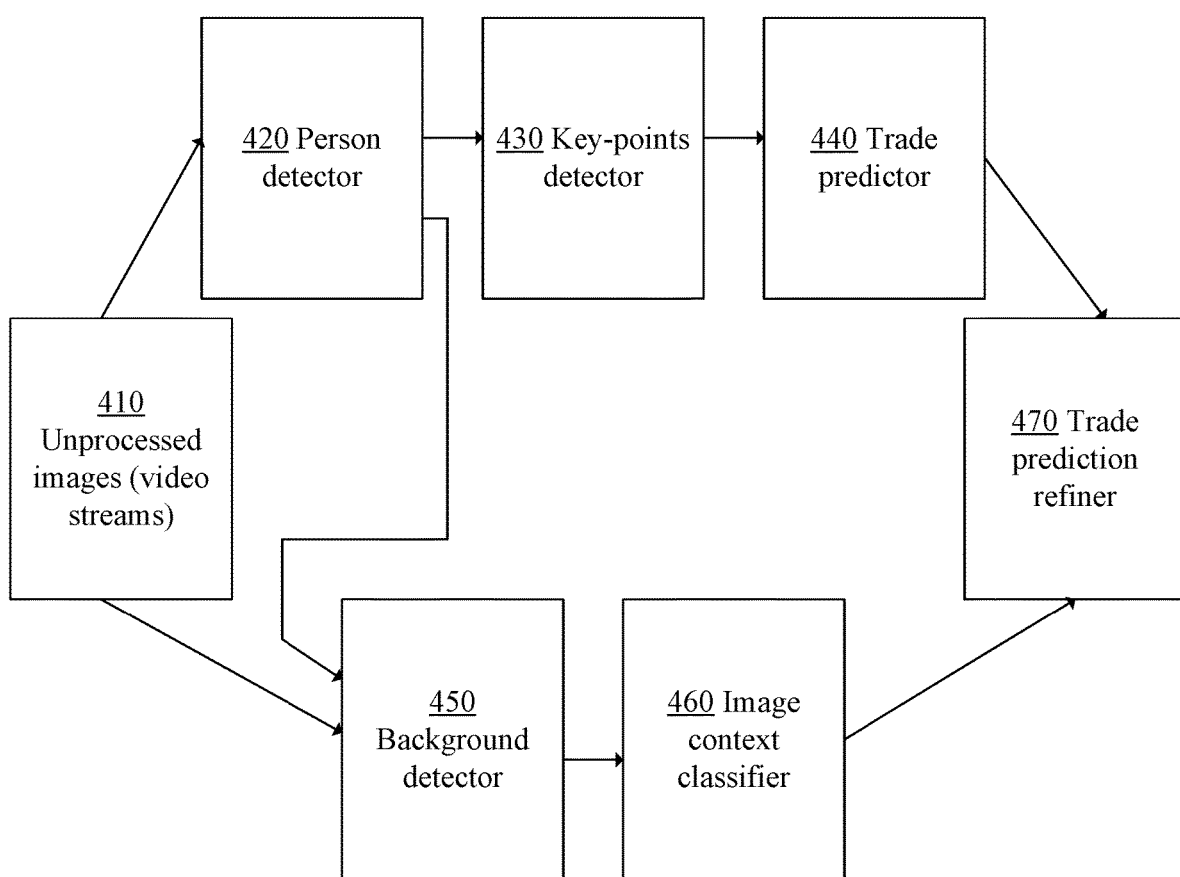
FIG. 4 depicts an example diagram of components used to recognize, using neural networks, trade workers present on industrial sites.

FIG. 4 depicts an example diagram of components used to recognize, using neural networks, trade workers present on industrial sites.

In FIG. 4, element 410 depicts a plurality of unprocessed images that have been received from video cameras installed inside and outside of an industrial site. Examples of video cameras are described in FIG. 1. The plurality of unprocessed images may include video streams captured by the video cameras.

The plurality of unprocessed images may be provided to a personnel detector 420. Personnel detector 420 may be configured to process the received plurality of unprocessed images, and may be implemented in a CNN, as described in steps 302-306 of FIG. 3.

Personnel detector 420 may process the plurality of unprocessed images to determine one or more groups of workers depicted in the images. The groups are formed in such a way that each group depicts a worker that is not depicted in other groups. Output from personnel detector 420 includes one or more groups grouped per workers that the groups of images depict.

Output from personnel detector 420 is provided to a key-point detector 430. Key-point detector 430 may be implemented in an RNN network, and may be configured to determine, based on the provided groups of images, sets of key points. For example, based on a group of images that depict a particular worker, key-point detector 430 may determine a plurality of key-point sets that capture positions that the particular worker depicted in the images assumed. This process is described in step 204 of FIG. 2.

Output from key-point detector 430 is provided to a trade predictor 440. Trade predictor 440 may be implemented in an RNN, and may be configured to determine, based on the output provided from key-point detector 430, a plurality of trade-specific activities performed by the particular worker depicted in the images. This process is described in step 206 of FIG. 2.

Based on the plurality of trade-specific activities, trade predictor 440 may determine a plurality of trade probabilities indicating the probabilities that the particular worker is indeed performing the corresponding trade-specific activities. A trade probability, of the plurality of trade probabilities, indicates a likelihood that the particular worker belongs to a trade of a plurality of trades. This process is described in step 208 of FIG. 2.

The plurality of trade probabilities is provided to a trade prediction refiner 470. Trade prediction refiner 470 may be implemented as a neural network, and may be configured to refine the trade probabilities, included in the plurality of trade probabilities, based on the information provided by an image context classifier 460. Image context classifier 460 is described later.

The plurality of unprocessed images may be also provided to a background detector 450. Alternatively, or in addition to, output from personnel detector 420 may be provided to background detector 450.

Background detector 450 may be implemented as a CNN, and configured to perform, for example, a patch-based scene segmentation to determine background datasets. This may include identifying a plurality of backgrounds depicted in the images. This process is described in step 210 of FIG. 2.

The background datasets, determined by background detector 450, are provided to image context classifier 460. Image context classifier 460 may be implemented in a multi-class CNN and may be configured to determine a plurality of context probabilities that the identified backgrounds are indeed depicted in the images.

A context probability, of the plurality of context probabilities, indicates a likelihood that a background dataset indicates a trade-specific context of a plurality of trade-specific contexts.

The context information and the corresponding context probability for an image may be determined using one or more neural networks. For example, a boundary and contents of the scene depicted in the image may be determined using the patch-based scene segmentation process executed by a CNN.

In an embodiment, an image of a particular scene is provided to a multi-class CNN-based classifier that outputs a plurality of context probabilities indicating likelihood that the depicted backgrounds are indicative of specific trades. This process is described in step 212 of FIG. 2.

Referring again to trade prediction refiner 470, trade prediction refiner 470 uses the plurality of trade probabilities and the plurality of context probabilities to refine the prediction of the trade to which the particular worker depicted in the images belongs. Specifically, based on both the plurality of trade probabilities and the plurality of context probabilities, trade prediction refiner 470 determines a plurality of refined probabilities. A refined probability, of the plurality of refined probabilities, determined for a particular trade, indicates a modified likelihood that the particular worker, depicted in the plurality of images, belongs to the particular trade of a plurality of trades.

6. EXAMPLE SENSOR MESHES

FIG. 5A, FIG. 5B, FIG. 5C, FIG. 5D depict examples of sensor meshes that could be used to recognize trade workers present on industrial sites. The depicted examples are merely samples of different templates that may be used to recognize positions that a worker may assume while performing a certain job. For example, FIG. 5A depicts an arrangement of sensors that indicates that a person who is depicted in the image is most likely standing and perhaps holding a long object, such as a long plank or a beam. This arrangement of sensors may be used to match it against a key-point set determined from a plurality of images depicting a particular worker to determine whether the arrangement and the key-point set information match. The degree to which they do may be captured by a trade-specific probability, as described above.

Figure 5B:
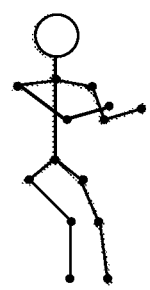

FIG. 5B depicts an arrangement of sensors that indicates that a person who is depicted in the image is most likely sitting down and using his hands to hold or attach something. This pose may indicate that the person depicted in the image is sitting down and attaching some wires, thus perhaps he is an electrician.

Figure 5C:

FIG. 5C depicts an arrangement of sensors that indicates that a person who is depicted in the image is most likely walking up the stairs and carrying some objects or parts up the stairs.

Figure 5D:
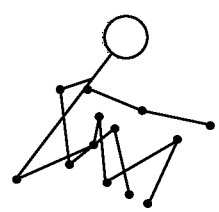

FIG. 5D depicts an arrangement of sensors that indicates that a person who is depicted in the image is most likely kneeling down and using his hands to lay something on the floor. This pose may indicate that the person depicted in the image is kneeling down and laying flooring planks on the floor, thus, perhaps he is a carpenter.

7. EXAMPLE IMPROVEMENTS PROVIDED BY CERTAIN EMBODIMENTS

In an embodiment, a neural network-based process for recognizing trade workers present on industrial sites provides many functionalities that have been sought by major industrial companies. The system is valuable and marketable to the companies for many reasons, including ability to monitor workers present on industrial sites, determine efficiency of workers and equipment, and determine accountability from subcontractors.

In an embodiment, a neural network-based process for recognizing trade workers present on industrial sites allows management teams to assess the workers' accountability and productivity. For example, based on the provided counts of trade workers present on a construction site, the management may determine the workers' productivity, absenteeism, redundancies, and inefficiencies. The management may also determine whether the invoices submitted by the contractors are correct and whether the work for which the invoices have been provided is indeed completed.

In an embodiment, based on the provided counts, the management may determine production rates and status for the work performed on the industrial site. For example, based on the counts, the management may determine what, by whom, and how quickly each task has been performed on the site.

8. IMPLEMENTATION EXAMPLE—HARDWARE OVERVIEW

According to one embodiment, the techniques described herein are implemented by at least one computing device. The techniques may be implemented in whole or in part using a combination of at least one computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of computers and/or personal computers.

Figure 6:
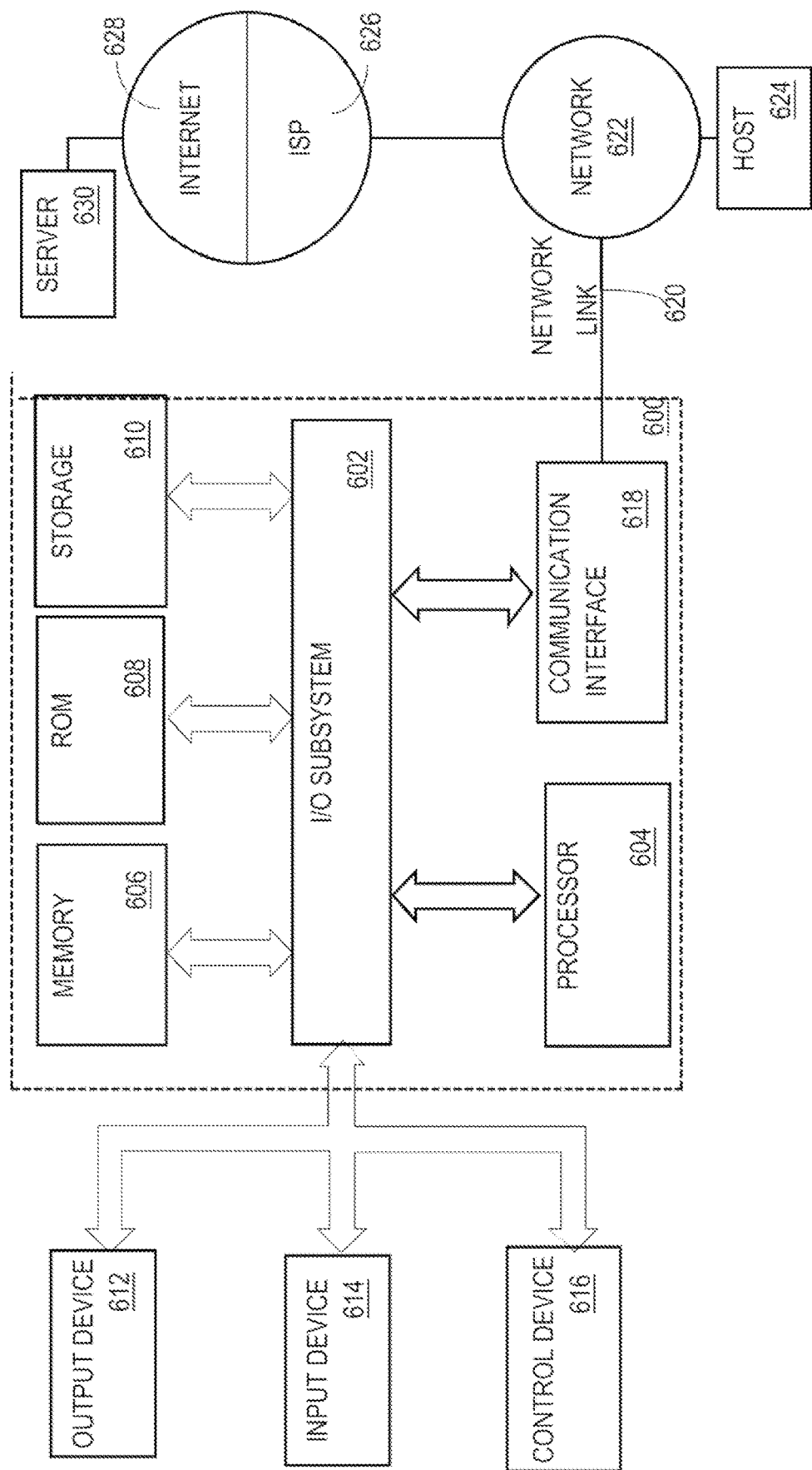
FIG. 6 is a block diagram that illustrates an example computer system with which an embodiment may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, instantiating several instances of d program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

9. EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   using a computing device, receiving a plurality of digital images depicting a particular worker;
   using the computing device, based on the plurality of digital images, determining a plurality of key-point sets of the digital images, each of the plurality of key-point sets comprising location information of key points identified within a depiction of the particular worker in a particular digital image;
   using the computing device, based on the plurality of key-point sets, determining a plurality of trade-specific activities that appear to be performed by the particular worker;
   using the computing device, based on the plurality of trade-specific activities, determining a plurality of trade probabilities, each trade probability among the trade probabilities indicating a likelihood that the particular worker belongs to a particular trade from among a plurality of trades.

2. The method of claim 1, further comprising:
extracting a plurality of background datasets from the plurality of digital images;
based on the plurality of background datasets, determining a plurality of context probabilities, wherein a context probability, of the plurality of context probabilities, indicates a likelihood that a background dataset, of the plurality of background datasets, indicates a trade-specific context of a plurality of trade-specific contexts.

3. The method of claim 2, further comprising:
based on the plurality of trade probabilities and the plurality of context probabilities, generating a plurality of refined probabilities, wherein a refined probability, of the plurality of refined probabilities, indicates a modified likelihood that the particular worker belongs to a trade of the plurality of trades;
selecting, from the plurality of refined probabilities, a highest probability;
based on the highest probability, determining a particular trade to which the particular worker belongs.

4. The method of claim 3, further comprising:
receiving a plurality of unprocessed images;
selecting, from the plurality of unprocessed images, the plurality of digital images that depict the particular worker;
wherein selecting, from the plurality of unprocessed images, the plurality of digital images that depict the particular worker comprises:
detecting a plurality of objects in the plurality of unprocessed images;
wherein detecting a plurality of objects in the plurality of unprocessed images includes one or more of: detecting colors of hard hats depicted in the plurality of unprocessed images, detecting stickers attached to hard hats depicted in the plurality of unprocessed images, recognizing, based on depiction of sensor meshes, positions of workers depicted in the plurality of unprocessed images, or detecting colors of outfits wore by workers depicted in the plurality of unprocessed images;
including, in the plurality of digital images that depict the particular worker, those images in which detected objects include the particular worker;
wherein selecting, from the plurality of unprocessed images, the plurality of digital images that depict the particular worker is performed by executing a convolutional neural network.

5. The method of claim 4, wherein the determining a plurality of trade probabilities is performed by executing a recurrent neural network;
wherein the plurality of trade probabilities is further determined based on determining, based on the plurality of key-point sets, additional activities depicted in the plurality of digital images;
wherein the additional activities include one or more of: walking, standing, climbing stairs, or sitting.

6. The method of claim 5, further comprising:
determining a plurality of resulting trades for all workers of a plurality of workers;
based on the plurality of resulting trades, determining counts of workers for each trade of the plurality of trades.

7. The method of claim 2, wherein the plurality of context probabilities is determined by executing a convolutional neural network to perform a patch-based scene segmentation.

8. A system comprising one or more processors, one or more non-transitory digital storage media coupled to the processors and storing one or more sequences of program instructions which, when executed using the one or more processors, cause the one or more processors to perform:
using a computing device, receiving a plurality of digital images depicting a particular worker;
using the computing device, based on the plurality of digital images, determining a plurality of key-point sets of the digital images, each of the plurality of key-point sets comprising location information of key points identified within a depiction of the particular worker in a particular digital image;
using the computing device, based on the plurality of key-point sets, determining a plurality of trade-specific activities that appear to be performed by the particular worker;
using the computing device, based on the plurality of trade-specific activities, determining a plurality of trade probabilities, each trade probability among the trade probabilities indicating a likelihood that the particular worker belongs to a particular trade from among a plurality of trades.

9. The system of claim 8, storing additional instructions for:
extracting a plurality of background datasets from the plurality of digital images;
based on the plurality of background datasets, determining a plurality of context probabilities, wherein a context probability, of the plurality of context probabilities, indicates a likelihood that a background dataset, of the plurality of background datasets, indicates a trade-specific context of a plurality of trade-specific contexts.

10. The system of claim 9, storing additional program instructions for:
based on the plurality of trade probabilities and the plurality of context probabilities, generating a plurality of refined probabilities, wherein a refined probability, of the plurality of refined probabilities, indicates a modified likelihood that the particular worker belongs to a trade of the plurality of trades;
selecting, from the plurality of refined probabilities, a highest probability;
based on the highest probability, determining a particular trade to which the particular worker belongs.

11. The system of claim 10, storing additional program instructions for:
receiving a plurality of unprocessed images;
selecting, from the plurality of unprocessed images, the plurality of digital images that depict the particular worker;
wherein selecting, from the plurality of unprocessed images, the plurality of digital images that depict the particular worker comprises:
detecting a plurality of objects in the plurality of unprocessed images;
wherein detecting a plurality of objects in the plurality of unprocessed images includes one or more of: detecting colors of hard hats depicted in the plurality of unprocessed images, detecting stickers attached to hard hats depicted in the plurality of unprocessed images, recognizing, based on depiction of sensor meshes, positions of workers depicted in the plurality of unprocessed images, or detecting colors of outfits wore by workers depicted in the plurality of unprocessed images;

including, in the plurality of digital images that depict the particular worker, those images in which detected objects include the particular worker;
wherein selecting, from the plurality of unprocessed images, the plurality of digital images that depict the particular worker is performed by executing a convolutional neural network.

12. The system of claim 11, wherein the determining a plurality of trade probabilities is performed by executing a recurrent neural network;
wherein the plurality of trade probabilities is further determined based on determining, based on the plurality of key-point sets, additional activities depicted in the plurality of digital images;
wherein the additional activities include one or more of: walking, standing, climbing stairs, or sitting.

13. The system of claim 12, storing additional program instructions for:
determining a plurality of resulting trades for all workers of a plurality of workers;
based on the plurality of resulting trades, determining counts of workers for each trade of the plurality of trades.

14. The system of claim 9, wherein the plurality of context probabilities is determined by executing a convolutional neural network to perform a patch-based scene segmentation.

15. One or more non-transitory digital storage media storing one or more sequences of program instructions which, when executed using one or more processors, cause the one or more processors to perform:
using a computing device, receiving a plurality of digital images depicting a particular worker;
using the computing device, based on the plurality of digital images, determining a plurality of key-point sets of the digital images, each of the plurality of key-point sets comprising location information of key points identified within a depiction of the particular worker in a particular digital image;
using the computing device, based on the plurality of key-point sets, determining a plurality of trade-specific activities that appear to be performed by the particular worker;
using the computing device, based on the plurality of trade-specific activities, determining a plurality of trade probabilities, each trade probability among the trade probabilities indicating a likelihood that the particular worker belongs to a particular trade from among a plurality of trades.

16. The one or more non-transitory digital storage media of claim 15, storing additional instructions for:
extracting a plurality of background datasets from the plurality of digital images;
based on the plurality of background datasets, determining a plurality of context probabilities, wherein a context probability, of the plurality of context probabilities, indicates a likelihood that a background dataset, of the plurality of background datasets, indicates a trade-specific context of a plurality of trade-specific contexts.

17. The one or more non-transitory digital storage media of claim 16, storing additional program instructions for:
based on the plurality of trade probabilities and the plurality of context probabilities, generating a plurality of refined probabilities, wherein a refined probability, of the plurality of refined probabilities, indicates a modified likelihood that the particular worker belongs to a trade of the plurality of trades;
selecting, from the plurality of refined probabilities, a highest probability;
based on the highest probability, determining a particular trade to which the particular worker belongs.

18. The one or more non-transitory digital storage media of claim 17, storing additional program instructions for:
receiving a plurality of unprocessed images;
selecting, from the plurality of unprocessed images, the plurality of digital images that depict the particular worker;
wherein selecting, from the plurality of unprocessed images, the plurality of digital images that depict the particular worker comprises:
detecting a plurality of objects in the plurality of unprocessed images;
wherein detecting a plurality of objects in the plurality of unprocessed images includes one or more of: detecting colors of hard hats depicted in the plurality of unprocessed images, detecting stickers attached to hard hats depicted in the plurality of unprocessed images, recognizing, based on depiction of sensor meshes, positions of workers depicted in the plurality of unprocessed images, or detecting colors of outfits wore by workers depicted in the plurality of unprocessed images;
including, in the plurality of digital images that depict the particular worker, those images in which detected objects include the particular worker;
wherein selecting, from the plurality of unprocessed images, the plurality of digital images that depict the particular worker is performed by executing a convolutional neural network.

19. The one or more non-transitory digital storage media of claim 18, wherein the determining a plurality of trade probabilities is performed by executing a recurrent neural network;
wherein the plurality of trade probabilities is further determined based on determining, based on the plurality of key-point sets, additional activities depicted in the plurality of digital images;
wherein the additional activities include one or more of: walking, standing, climbing stairs, or sitting.

20. The one or more non-transitory digital storage media of claim 19, storing additional program instructions for:
determining a plurality of resulting trades for all workers of a plurality of workers;
based on the plurality of resulting trades, determining counts of workers for each trade of the plurality of trades.

* * * * *